United States Patent [19]

Acar

[11] 4,301,715
[45] Nov. 24, 1981

[54] 4-WAY, 2-POSITION PILOT VALVE
[75] Inventor: Ali Acar, Los Angeles, Calif.
[73] Assignee: International Telephone and Telegraph Corporation, New York, N.Y.
[21] Appl. No.: 107,384
[22] Filed: Dec. 26, 1979
[51] Int. Cl.³ .......................................... F15B 13/044
[52] U.S. Cl. .................................... 91/457; 91/459; 91/462; 137/596.17; 137/864
[58] Field of Search ...................... 91/459, 457, 462; 137/596.17, 864, 625.26, 625.49

[56] References Cited
U.S. PATENT DOCUMENTS
4,026,325  5/1977  Loveless .......................... 137/625.26
4,063,568 12/1977  Sosulnikov et al. ....... 137/625.27 X Primary Examiner—Gerald A. Michalsky
Attorney, Agent, or Firm—A. Donald Stolzy

[57] ABSTRACT

A 4-way, 2-position pilot valve having two ball valves seatable at approximately the same time without a precise spacing.

2 Claims, 3 Drawing Figures

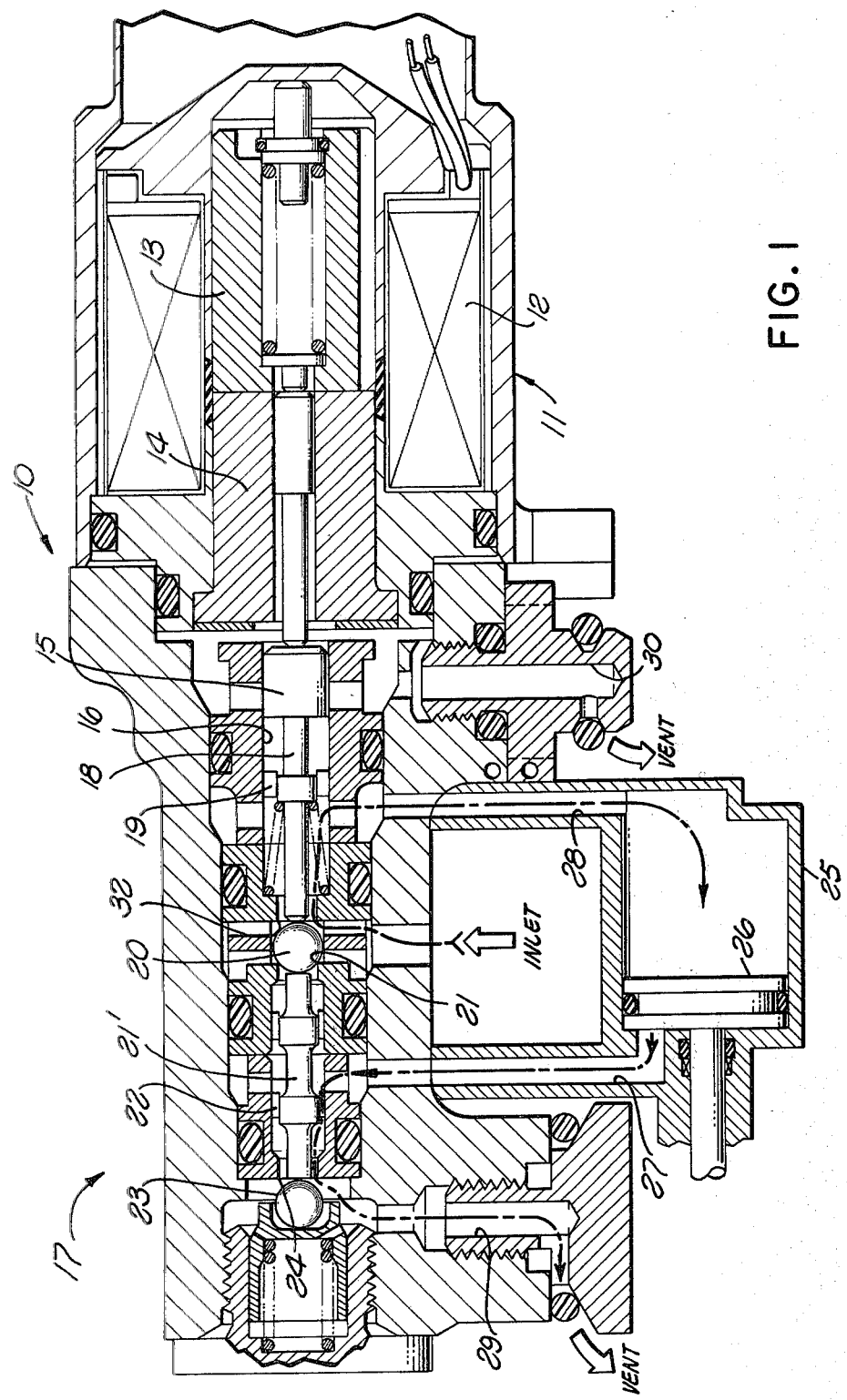

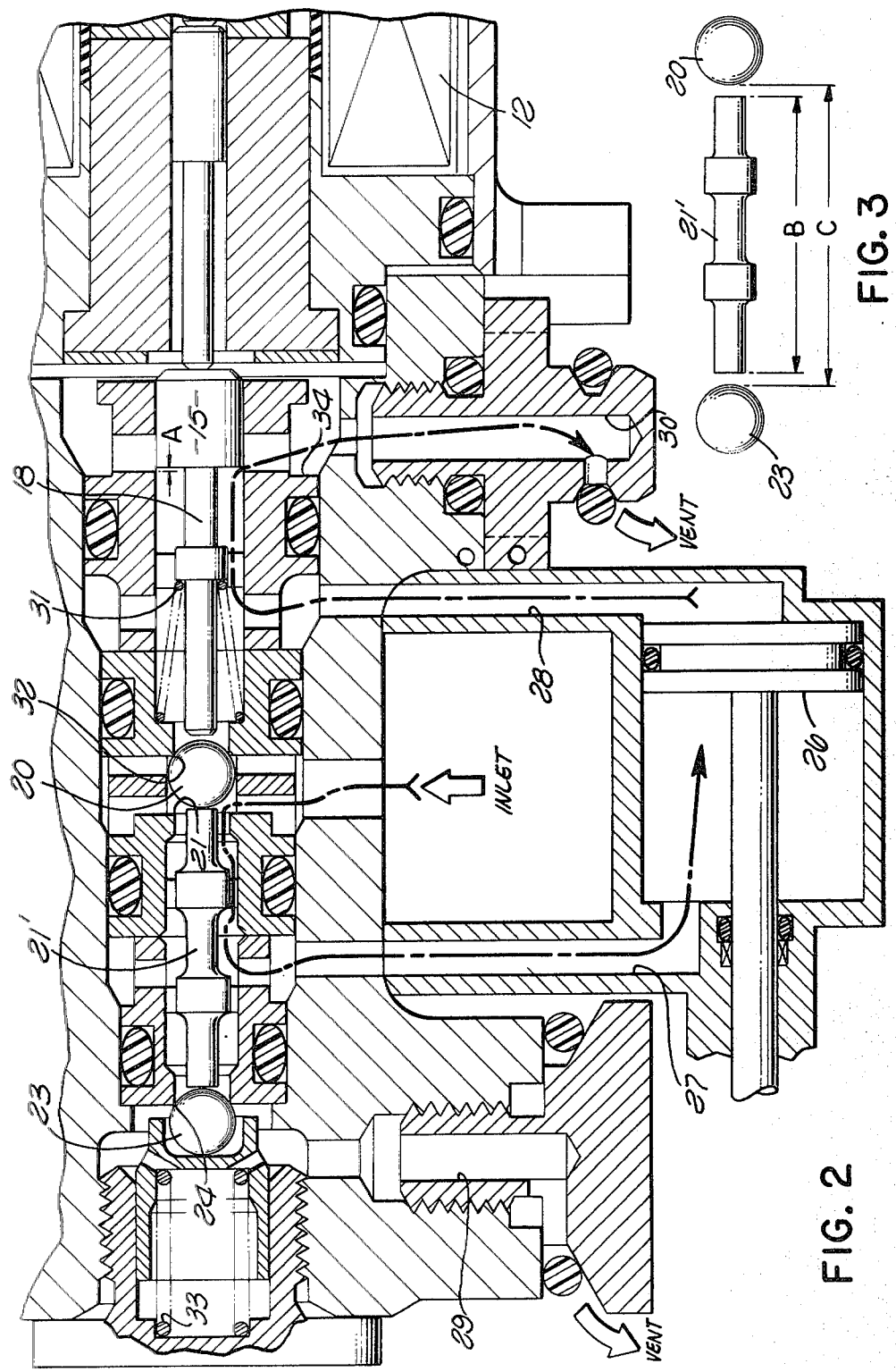

4-WAY, 2-POSITION PILOT VALVE

BACKGROUND OF THE INVENTION

This invention relates to the fluid handling art, and more particularly to a 4-way, 2-position pilot valve.

PRIOR ART STATEMENT

In the past, 4-way, 2-position pilot valves have required 3 ball valves. Two of these must normally seat simultaneously. This means that the ball valve spacing must be arranged very precisely. Further, this spacing precision makes the construction of such a valve difficult and expensive.

SUMMARY OF THE INVENTION

In accordance with the valve of the present invention, the above-described and other disadvantages of the prior art are overcome by providing two ball valves which seat approximately at the same time without the requirement of critical spacing.

BRIEF DESCRIPTION OF THE DRAWINGS

FIG. 1 is a longitudinal sectional view of a valve constructed in accordance with the present invention;

FIG. 2 is a longitudinal sectional view of the valve of FIG. 1 shown in a different position; and FIG. 3 is a diagrammatic view of a portion of FIG. 2.

DESCRIPTION OF THE PREFERRED EMBODIMENT

In FIG. 1, a 4-way 2-position pilot valve 10 is shown. Valve 10 includes a solenoid assembly 11 which houses a solenoid 12. Energization of solenoid 12 causes movement of an armature 13 to the left, as shown. Armature 13 abuts a pole piece 14 in FIG. 1.

Energization of solenoid 12 pushes a pilot piston 15 to the left, as viewed in FIG. 1. Pilot piston 15 is guided in a bore 16 which is formed in a valve housing 17. A rod 18 is fixed to or integral with pilot piston 15 and slides in ribs 19.

In the position shown in FIG. 1, rod 18 presses a ball 20 against a seat 21. Ball 20 thus seals off the left portion of the housing 17. A valve stem 21', slidable in ribs 22, pushes a ball 23 away from a seat 24.

A main cylinder is provided at 25 having a piston 26 reciprocable therein. Cylinder 25 is provided with ports 27 and 28 on opposite sides of piston 26.

Exhaust passages are provided at 29 and 30.

In FIG. 2, note will be taken that solenoid 12 is no longer energized, and a spring 31 moves rod 18 to the right. In this location, rod 18 does not touch ball 20 when it rests against a seat 32. Ball 23 then rests against seat 24. Ball 23 is pushed to the right, as viewed in FIG. 2, by a spring 33.

OPERATION

In FIG. 1, main piston 26 is pressed to the left by a preponderance of inlet pressure through a passage defined by valve seat 32. In the position shown, ball valve 20 is pushed to the left by rod 18 which, in turn, is pushed to the left by armature 13, solenoid 12 having been energized.

Rod 18 pushes ball 20 against seat 21 and closes the port defined thereby. At the same time, valve stem 21' pushes ball valve 23 to a position spaced from valve seat 24. Cylinder port 27 is then vented to exhaust passage 29 through the port defined by valve seat 24.

Inlet pressure is supplied to the right side of main piston 26 via cylinder port 28 from the port inside valve seat 32 as described previously.

Ball 23 is thereafter moved to the right as are other parts by spring 33. As stated previously, rod 18 is kept out of contact with ball valve 20 by spring 31.

Although, as drawn, it may appear that valve stem 21' touches both valve 23 and valve 20 in FIG. 2, it does not. The entire length B of valve stem 21' is less than the distance C between the extreme right portion of ball valve 23 and the extreme left portion of ball valve 20 (see FIG. 3). Spring 33 holds only ball valve 23 against valve seat 24. Further, only the inlet pressure holds ball valve 20 against seat 32.

Inlet pressure is supplied to the left side of main piston 26 through the port defined by valve seat 21 and cylinder port 27. Cylinder port 28, at the same time, is exhausted through passage 30 via a space A between the left end of pilot piston 15 and a through hole 34 (FIG. 2).

Spacings are exaggerated in FIG. 3 to illustrate that dimension B is smaller than dimension C in FIG. 2.

What is claimed is:

1. A 4-way, 2-position pilot valve, said valve comprising: a housing, first and second exhaust passages in said housing; a cylinder; a main piston slidable in said cylinder; first and second cylinder ports in communication with said cylinder on opposite sides of said main piston, respectively; an inlet port in said housing; first, second and third annular valve seats in said housing; a first valve stem slidable in said housing; first and second ball valves movably supported in said housing; a first spring supported in said housing in a manner to bias said first ball valve against said first seat, reciprocation of said first valve stem in one direction causing said first ball valve to be pushed off of said first seat, said first valve stem being located between said first and second ball valves, said first valve stem having a length less than the distance between said first and second ball valves when said first and second ball valves engage said first and third valve seats, respectively, said inlet port being in communication with said second ball valve to enter through one of said second and third valve seats, the pressure in said inlet port causing said second ball valve, when in one position to seal against said third seat; a second valve stem including a cylindrical pilot piston fixed therewith slidable in said housing, said housing having a cylindrical portion with a cylindrical wall and a hole through said wall, said hole being vented externally of said housing, said pilot piston being slideable contiguously within said cylindrical wall in one direction to open said hole to the interior of said housing cylindrical portion, and slidable in the opposite direction, said pilot piston, when in one position, sealing said hole shut, said pilot piston having means connected therewith to push said second ball valve from said one position in engagement with said third seat to another position in engagement with said second seat, said first ball valve being pushed to a position spaced from said first seat by engagement of said second ball valve with said first valve stem and by engagement of said first valve stem with said first ball valve; a spring to bias said second valve stem out of engagement with said second ball valve when said second ball valve engages said third seat; and selectively operable reciprocatory means to move said second valve stem to an extent to cause said hole to be sealed and to cause said second ball valve to engage said second valve seat.

2. The invention as defined in claim 1, wherein, during a first condition, said inlet pressure moves through said third seat and through said second cylinder port into said cylinder on one side of said main piston when said second ball valve is spaced from said third seat, during a second condition said inlet pressure moving through said second seat and through said first cylinder port into said cylinder on the other side of said main piston when said second ball valve is spaced from said second seat, during said first condition said first cylinder port being vented through said first seat to said first exhaust passage, during said second condition said second cylinder port being vented to said second exhaust passage by movement of said pilot piston to expose said second exhaust passage to said second cylinder port.

* * * * *